United States Patent [19]
Lambert

[11] 3,941,461
[45] Mar. 2, 1976

[54] HINGE ATTACHED TO THE SPLIT ENDS MEANS FOR ALIGNING AN EYEGLASS FRAME AT THE SPLIT ENDS THEREOF AND ALSO THE FRONT

[75] Inventor: Raymond E. Lambert, North Attleboro, Mass.

[73] Assignee: Lambert Anodizing Co., Inc., Attleboro, Mass.

[22] Filed: Sept. 3, 1974

[21] Appl. No.: 502,343

[52] U.S. Cl. .............. 351/95; 16/128 A; 351/121; 351/153
[51] Int. Cl.² .................. G02C 1/08; G02C 5/22
[58] Field of Search ............ 16/128 A; 351/90, 121, 351/153, 95, 96, 100, 140

[56] References Cited
UNITED STATES PATENTS

| | | | |
|---|---|---|---|
| 1,708,200 | 4/1929 | Welsh | 351/121 X |
| 3,052,159 | 9/1962 | Gross et al. | 351/121 |
| 3,589,802 | 6/1971 | Amaru | 351/90 |

*Primary Examiner*—Paul A. Sacher
*Attorney, Agent, or Firm*—Barlow & Barlow

[57] ABSTRACT

A lens frame is split to afford mounting of the lens therein and a front hinge is attached to the split ends for mounting the temple. A pin aligns the split ends of the frame and the front hinge parts which affords numerous advantages of strength as well as alignment.

1 Claim, 3 Drawing Figures

HINGE ATTACHED TO THE SPLIT ENDS MEANS FOR ALIGNING AN EYEGLASS FRAME AT THE SPLIT ENDS THEREOF AND ALSO THE FRONT

BACKGROUND OF THE INVENTION

The split front hinge is now an accepted form as a device which is practical for locking the opening of metallic lens frames. The hinge is first riveted to the seamless frame and the frame and hinge together are then sawed through to allow the frame to open with two parts of the hinge, one part attached to one end and the other part attached to the other end. An assembly screw joins the frame and hinge parts back together and the front hinge and screw serve as a further lock and guard against separation. The problem with this unit has been that all of the locking is done in the hinge back and away from the frame itself. Other frames provide a screw or cylinder and screw machined in the aluminum frame at a place adjacent to the hinge. These frames rely solely on one screw to hold them together and this screw being round there is no actual way for them to be kept from rotating out of alignment.

SUMMARY OF THE INVENTION

In this invention an alignment pin locks the hinge openings in line and also serves to securely align the two ends of the frame and prevent the two halves of the split hinge from rotating. The hinge cavity for the pin is part in the frame and part in the hinge base. The temple is also prevented from flopping up and down by locking the hinge halves with each other and the frame. This pin also serves to prevent lens breakage by frame halves moving when the frame is put on or taken off. The optician is also assisted or aided in fitting the lens by keeping the frame in line while he is doing a precise job and holding the parts in position while he tightens the locking assembly screw and attaches the temples.

DESCRIPTION OF THE PREFERRED EMBODIMENT

Figure 1:
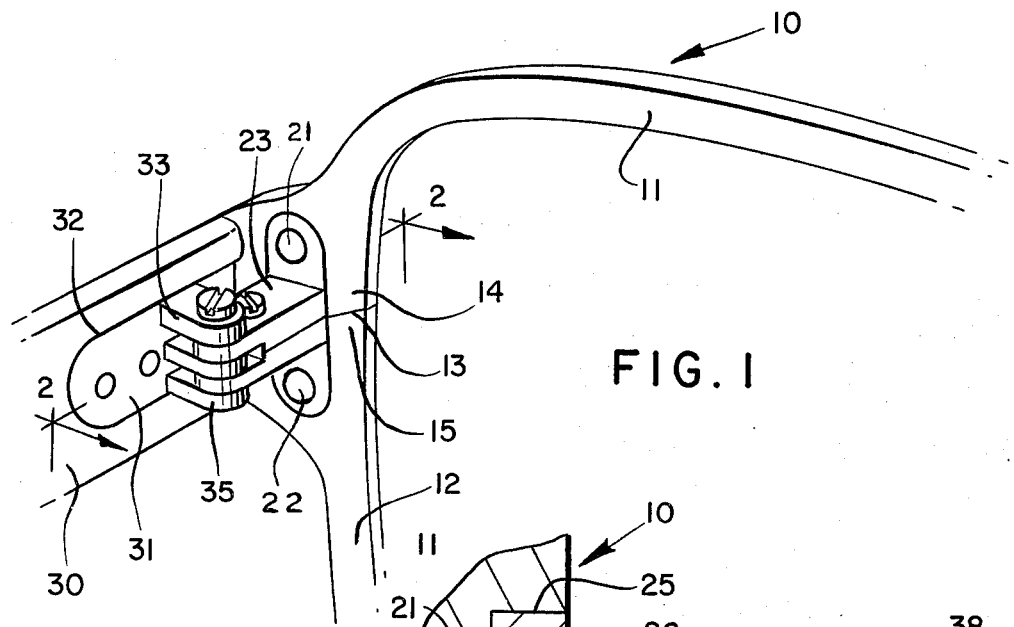
FIG. 1 is a perspective view looking at the back side of a portion of a lens frame with the front hinge mounted thereon and showing a portion of the temple.

In FIG. 1, 10 designates generally the lens rim having an upper temporal portion 11 and a lower temporal portion 12 with a split as at 13 which provides abutting rim ends 14 and 15 at the so-called split 13.

Figure 2:
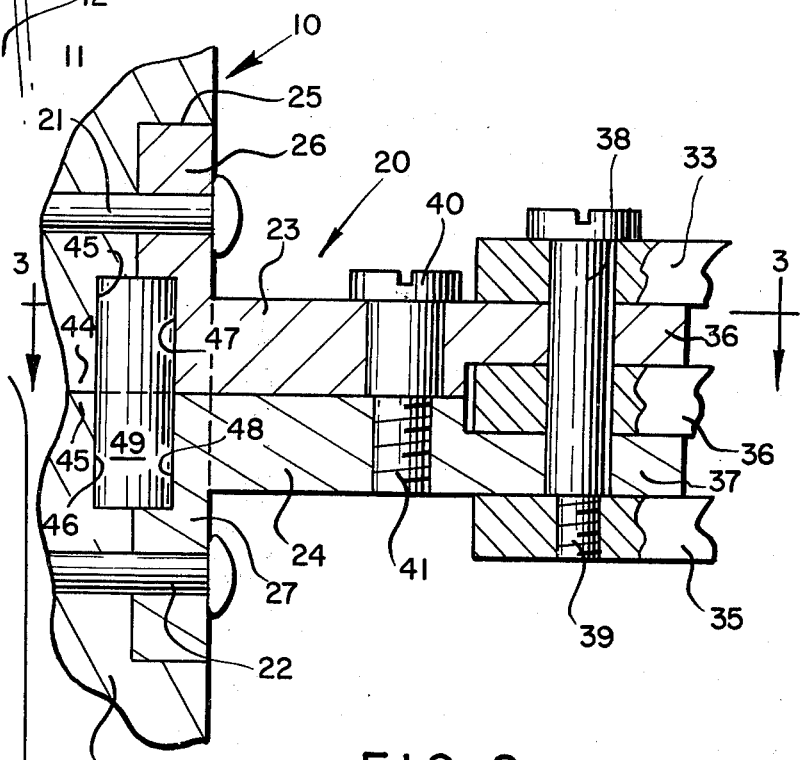
FIG. 2 is a section on substantially line 2-2 of FIG. 1.
Figure 3:
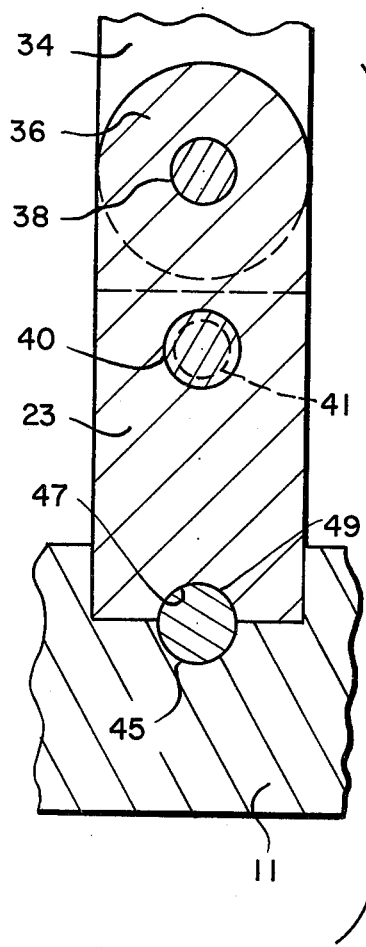
FIG. 3 is a section along substantially line 3-3 of FIG. 2.

The front hinge is designated generally 20 and originally consists of a single integral piece which is set into a first recess 25 in the rear face of the frame and attached to lens rim 10 by rivets 21 and 22. This hinge and lens rim 10 are then sawed through to provide an upper hinge part 23 and a lower hinge part 24 and at the same time provide the split 13 in the lens rim 10 for opening the rim to insert the lens therein, the upper temporal portion 14 and lower temporal portion 15 thus formed being brought together into abutting relation by screw 40 to hold the lens in place. The lens rim is recessed as at 25 so that the base 26 of the hinge portion 20 may be inserted therein to come flush with the rear face of the lens rim as seen in FIG. 2.

A temple 30 is attached to this hinge portion 20 by a complemental hinge portion 31 which is set into a recess 32 in the temple and has ears 33 interleaved with the ears 36 and 37 of the front hinge 20. A pin 38 having a threaded portion 39 is threaded into the ear 35 and serves as a pintle for the operation of the hinge portions 31 and 20. A pin 40 extends through the hinge part 23 and is threaded as at 41 into the hinged part 24 so as to hold the parts 23 and 24 in abutting relation and also hold the temporal end portions 14 and 15 in abutting relation as seen in FIGS. 1 and 2.

The abutting temporal ends 14, 15 are provided with second recesses 45 and 46, and cavities 47, 48 extend into the base portions 26, 27 of the hinge parts 23 and 24. A pin 49 of a size to closely fit extends into these second recesses and cavities and serves to align the two hinge parts 23 and 24 and the two temporal end portions 14 and 15 thus preventing twisting of the lens rim parts 11 and 12 at the split portion 13 and also prevents misalignment of the lens rim and holds it in substantially the plane of the lens as desired.

I claim:

1. In combination a spectacle frame front having a substantially flat rear face portion at the outer edges thereof remote from the central nasal portion, first recess means in each of the temporal portions of said rear face portion, said temporal portion having a split therethrough and through the first recess means, each of the temporal portions thereof extending from an outer edge to a lens opening defining an upper temporal rear face portion and a lower temporal rear face portion, front hinge means having a base received in each of said first recess means, said front hinge means comprising two parts with one part secured to a respective upper face portion and the other part secured to a respective lower face portion, a second recess formed within each of said first recesses, an aligning pin means in each of said second recess means, the base of each respective front hinge means having a cavity formed therein, said pin received in the second recess means and cavity whereby alignment of the base in the first recess means is achieved.

* * * * *